United States Patent
Holzhueter

(10) Patent No.: US 8,038,196 B2
(45) Date of Patent: Oct. 18, 2011

(54) VEHICLE SEAT, ESPECIALLY MOTOR VEHICLE SEAT

(75) Inventor: Walter Holzhueter, Southgate, MI (US)

(73) Assignee: KEIPER GmbH & Co. KG, Kaiserslautern (DE)

( * ) Notice: Subject to any disclaimer, the term of this patent is extended or adjusted under 35 U.S.C. 154(b) by 230 days.

(21) Appl. No.: 12/477,405

(22) Filed: Jun. 3, 2009

(65) Prior Publication Data
US 2010/0308618 A1 Dec. 9, 2010

(51) Int. Cl.
*B60N 2/02* (2006.01)
(52) U.S. Cl. .................................................. 296/65.05
(58) Field of Classification Search ............. 296/65.05, 296/65.13, 65.14; 248/424, 429, 430; 242/384.5; 297/341, 344.1, 378.12, 367 R; 180/368; 280/735, 806
See application file for complete search history.

(56) References Cited

U.S. PATENT DOCUMENTS

| | | | | |
|---|---|---|---|---|
| 4,285,487 A * | 8/1981 | Kazaoka et al. | | 248/396 |
| 5,695,247 A * | 12/1997 | Premji | | 297/341 |
| 6,059,345 A * | 5/2000 | Yokota | | 296/65.14 |
| 6,250,704 B1 | 6/2001 | Garrido | | |
| 6,338,516 B1 * | 1/2002 | Toyota et al. | | 296/37.2 |
| 6,631,952 B1 * | 10/2003 | Liebetrau et al. | | 297/341 |
| 6,648,394 B2 * | 11/2003 | Lejeune et al. | | 296/65.13 |
| 6,655,738 B2 * | 12/2003 | Kammerer | | 297/331 |
| 6,772,985 B2 * | 8/2004 | Lee | | 248/424 |
| 6,773,068 B2 * | 8/2004 | Shinozaki | | 297/344.1 |
| 6,793,285 B1 * | 9/2004 | Tame | | 297/336 |
| 6,964,452 B2 * | 11/2005 | Kammerer | | 297/331 |
| 7,252,318 B2 * | 8/2007 | Sumida et al. | | 296/64 |
| 7,270,375 B2 * | 9/2007 | Lutzka et al. | | 297/331 |
| 7,484,794 B2 * | 2/2009 | Loup et al. | | 296/208 |
| 7,578,537 B2 * | 8/2009 | Baetz et al. | | 296/65.09 |
| 7,748,766 B2 * | 7/2010 | Villeminey | | 296/64 |
| 7,854,461 B2 * | 12/2010 | Yamada | | 296/65.05 |
| 7,874,606 B2 * | 1/2011 | Yamamura et al. | | 296/64 |
| 2004/0051361 A1 * | 3/2004 | Rausch et al. | | 297/341 |
| 2010/0156134 A1 * | 6/2010 | McBride | | 296/65.09 |
| 2010/0308618 A1 * | 12/2010 | Holzhueter | | 296/65.05 |

FOREIGN PATENT DOCUMENTS

| | | |
|---|---|---|
| DE | 198 27 065 A1 | 12/1999 |
| DE | 102006007139 | 8/2007 |
| EP | 1 413 473 A1 | 4/2004 |

* cited by examiner

*Primary Examiner* — Kiran B. Patel
(74) *Attorney, Agent, or Firm* — McGlew and Tuttle, P.C.

(57) ABSTRACT

A vehicle seat (1), especially a motor vehicle seat, has at least one lockable pair of seat rails (3) for adjusting various longitudinal positions of the seat, which the vehicle seat (1) can assume in the use position suitable for the transport of passengers. A rail actuation device (12) is provided for unlocking the pair of seat rails (3). At least one lock (5) is provided for locking with the vehicle structure, whereby after unlocking the lock (5), the vehicle seat (1) can be converted from the use position into a nonuse position. A lock actuation device (14) is provided for unlocking the lock (5). A stop (16) is provided which is operative between the pair of seat rails (3) and/or rail actuation (12), on the one hand, and the lock actuation (14) and/or lock (5), on the other hand.

14 Claims, 5 Drawing Sheets

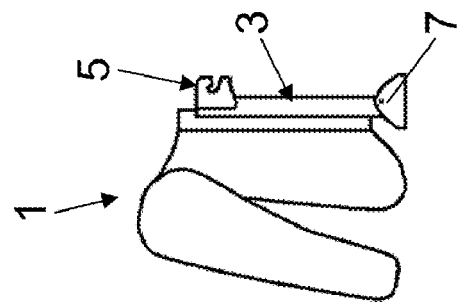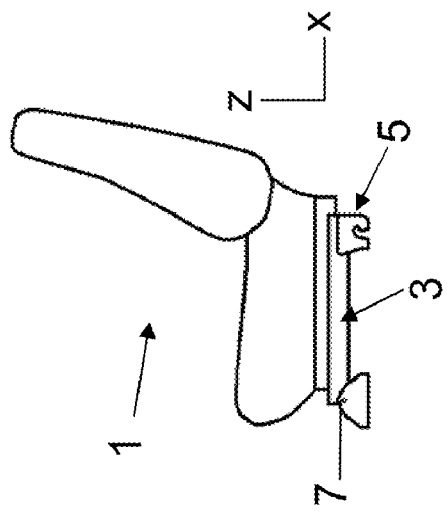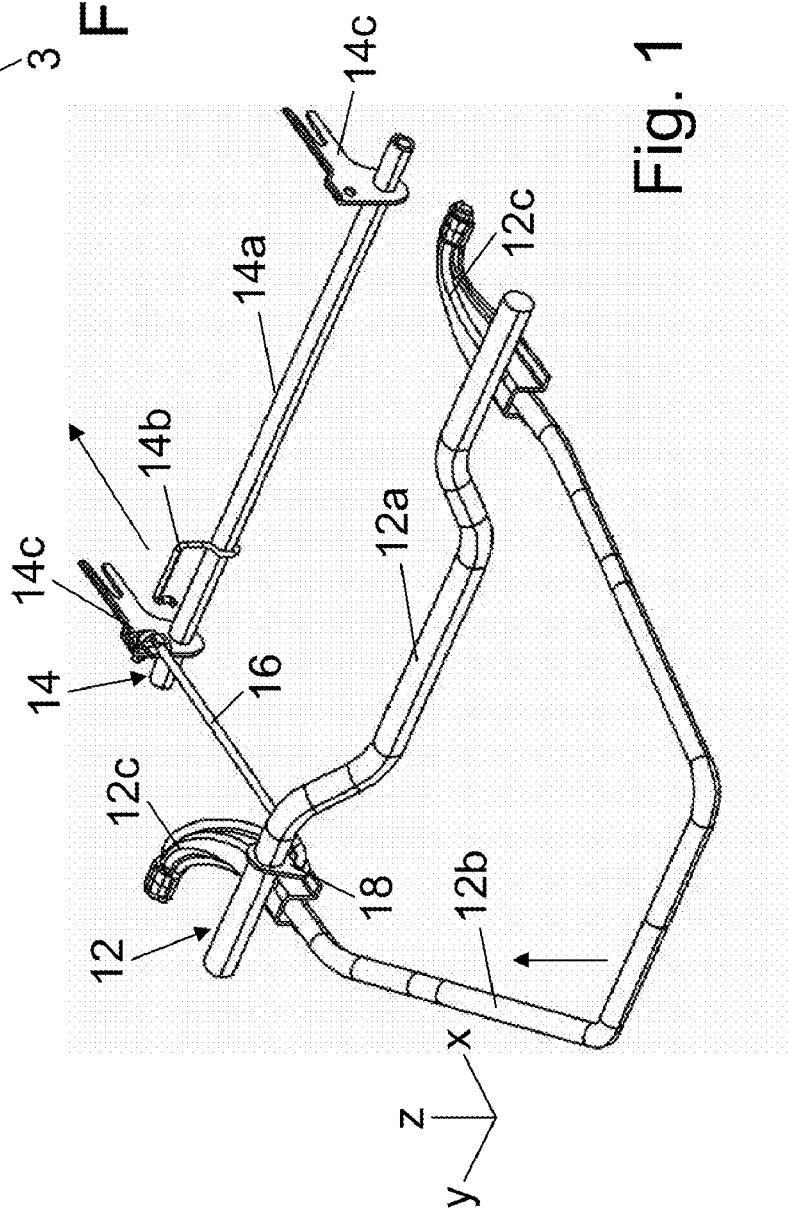

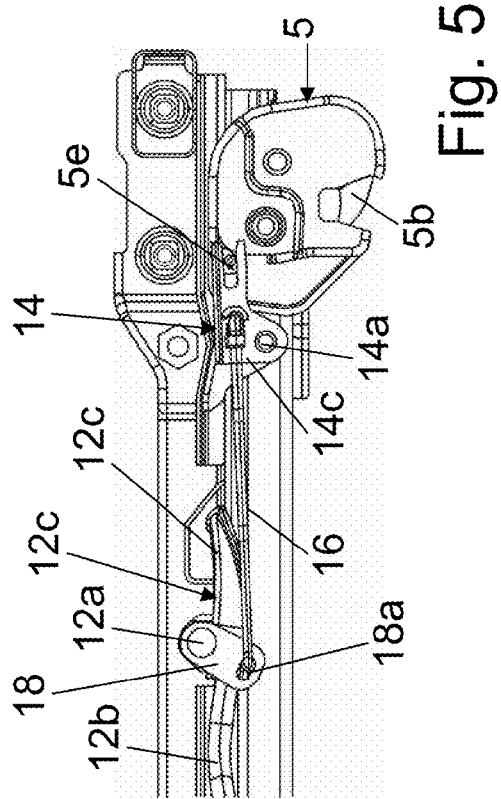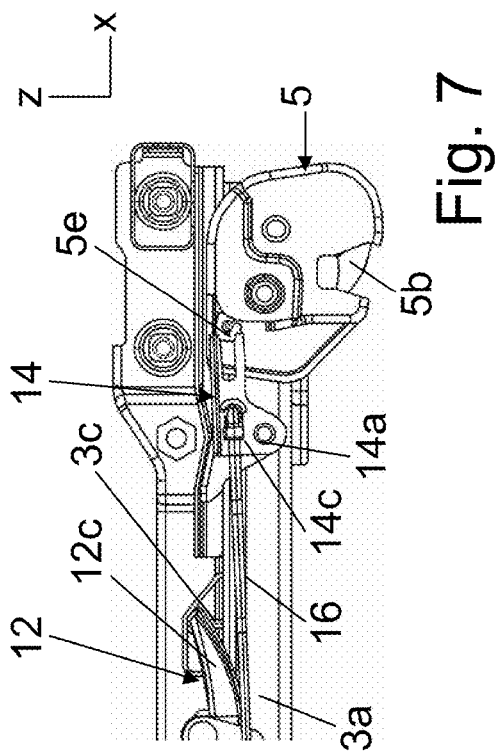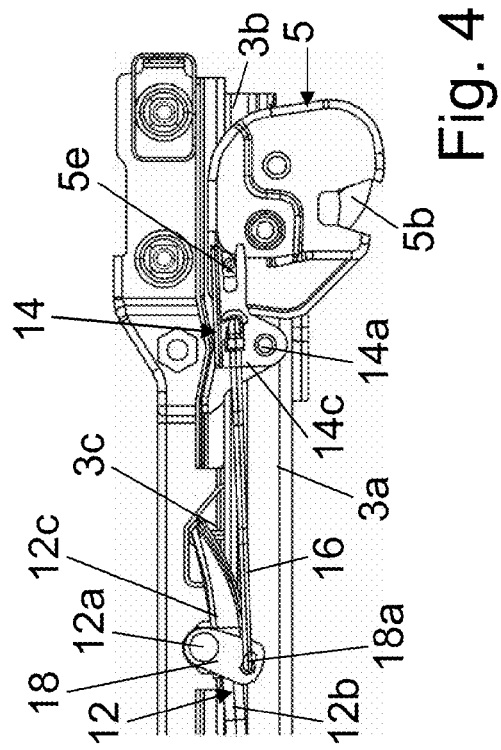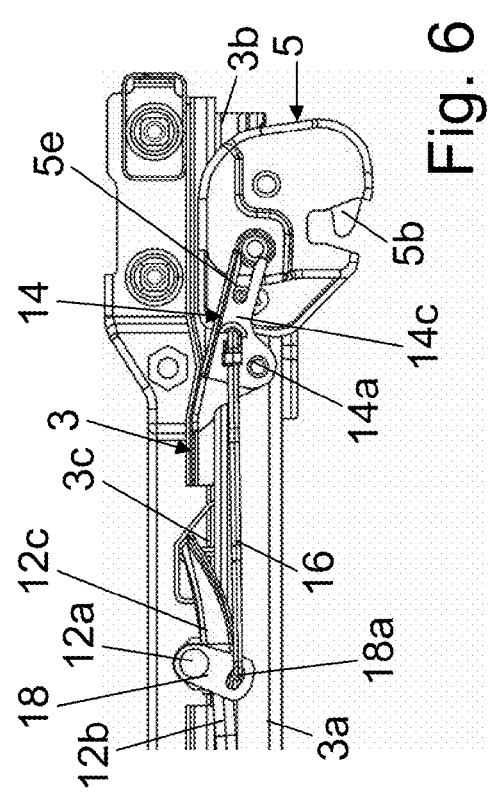

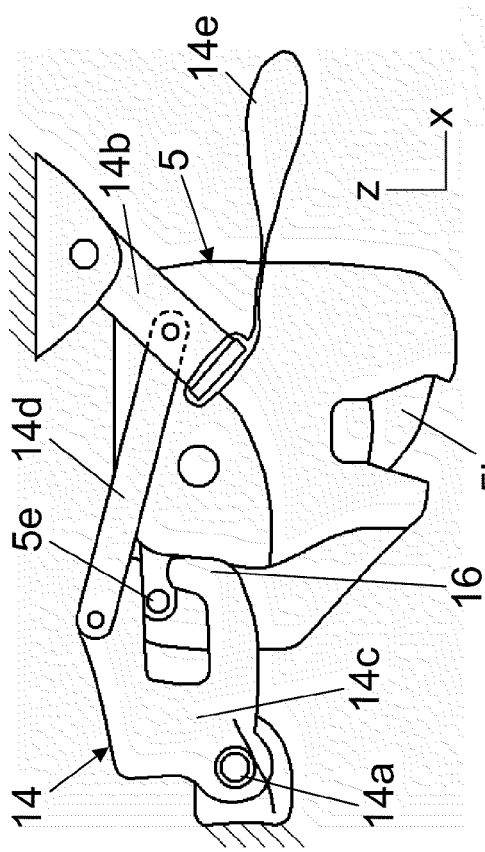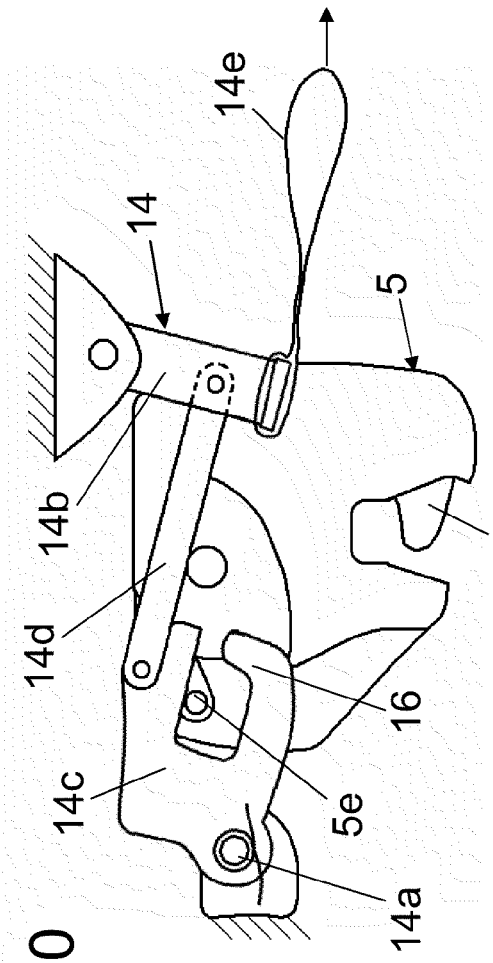

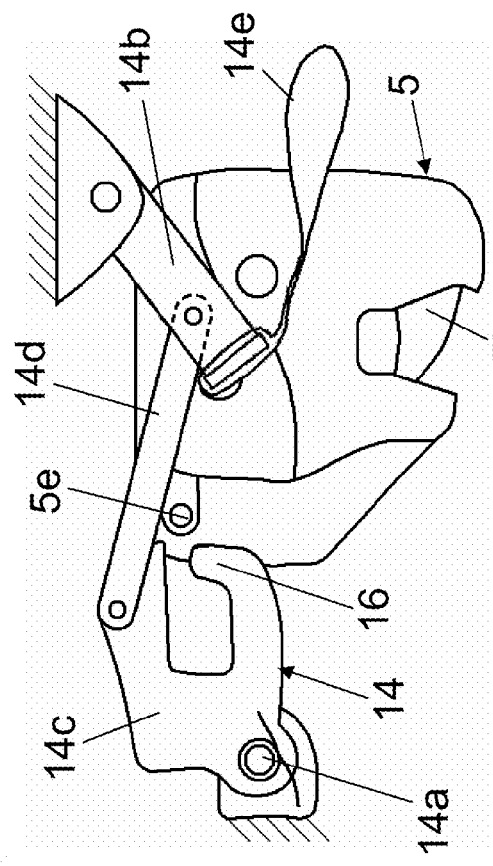
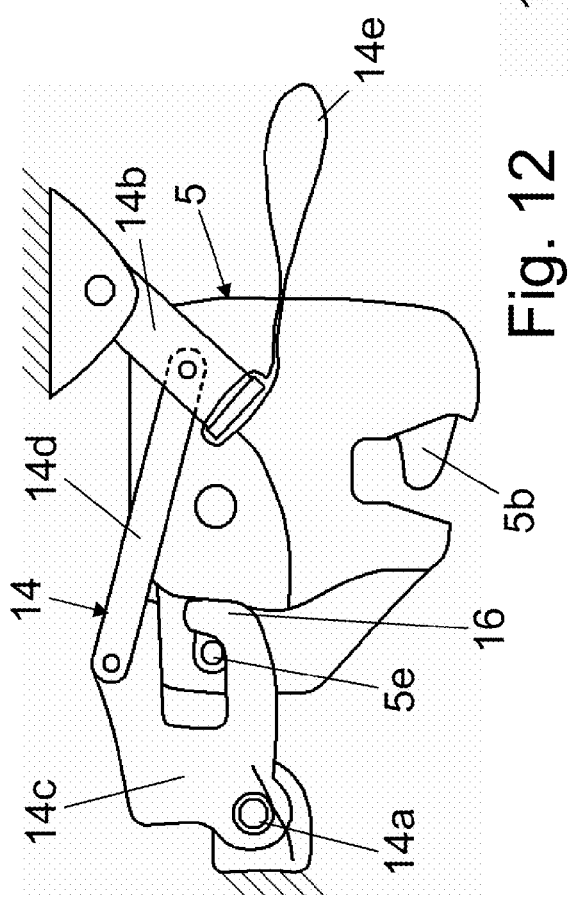
Fig. 13
Fig. 12

VEHICLE SEAT, ESPECIALLY MOTOR VEHICLE SEAT

FIELD OF THE INVENTION

The present invention pertains to a vehicle seat, especially a motor vehicle seat, with at least one lockable pair of seat rails for adjusting various longitudinal positions of the seat, which the vehicle seat can assume in the use position suitable for the transport of passengers, and at least one lock, whereby the vehicle seat can be converted from the use position into a nonuse position after the lock is unlocked.

BACKGROUND OF THE INVENTION

A vehicle seat of this type has become known from DE 10 2006 007 139 A1, whose pair of seat rails has a first seat rail rigidly connected to the vehicle structure and a second seat rail carrying the vehicle seat, as a result of which the vehicle seat can be adjusted in the longitudinal direction as a whole. The lock is provided at a rear foot of the vehicle seat and is locked with the second seat rail. After unlocking, the rear foot can be raised with the lock in relation to the pair of seat rails and can be moved forwards.

SUMMARY OF THE INVENTION

The basic object of the present invention is to provide an alternative to the vehicle seat of the type mentioned in the introduction, which, moreover, has a design that is safe in terms of operation.

According to the invention, a vehicle seat is provided comprising a lockable pair of seat rails for adjusting various longitudinal positions of the vehicle seat, which the vehicle seat can assume in a use position suitable for the transport of passengers. A rail actuation device is provided for unlocking the pair of seat rails. A lock is provided for locking with the vehicle structure, whereby the vehicle seat, after unlocking the lock, can be converted from the use position into a nonuse position. A lock actuation device is provided for unlocking the lock with a stop operative between the pair of seat rails and/or the rail actuation device, on the one hand, and the lock actuation device and/or lock, on the other hand.

While the lock locks with the vehicle structure, i.e., the lock is provided between the pair of seat rails and the vehicle structure, the pair of seat rails may also be converted into the nonuse position, so that as few components of the vehicle seat as possible remain on the vehicle floor in the nonuse position. This increases cargo space or facilitates entry into a rear row of seats. The stop between the rail actuation device and the lock actuation device prevents forbidden dual actuations and uncouples single actuations, which provides for the operating safety. A void at the stop, for example, a slot-pin guide, or a relative movement of the stop transversely to the longitudinal direction of the seat, provides for the uncoupling. With a rigid stop, Bowden cables can be avoided. A limitation of the lock actuation device to a rear (preferably the rearmost) longitudinal position of the seat can be achieved by a fork-shaped design of an output element of the lock actuation device with a mount for an unlocking bolt or the like of the lock. This output element travels along with the longitudinal adjustment and acts on the lock in the rear longitudinal position of the seat first.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIG. 1 is a view of rail actuation device and lock actuation device with a stop according to a first exemplary embodiment;

FIG. 2 is a schematic view of the vehicle seat in the use position;

FIG. 3 is a schematic view of the vehicle seat in the nonuse position;

FIG. 4 is a partial view of the vehicle seat in the use position in a rear longitudinal position of the seat with a stop according to the first exemplary embodiment;

FIG. 5 is a partial view corresponding to FIG. 4 with actuated rail actuation device;

FIG. 6 is a partial view corresponding to FIG. 4 with actuated lock actuation device;

FIG. 7 is a partial view corresponding to FIG. 4 in a longitudinal position of the seat further forwards;

FIG. 10 is a partial view of the vehicle seat in the use position in a rear longitudinal position of the seat with a stop according to the second exemplary embodiment;

FIG. 11 is a partial view corresponding to FIG. 10 during actuation of the lock actuation device;

FIG. 12 is a partial view corresponding to FIG. 10 after actuation of the lock actuation device; and FIG. 13 is a partial view corresponding to FIG. 10 in a longitudinal position of the seat further forwards.

DESCRIPTION OF THE PREFERRED EMBODIMENT

Figure 9:
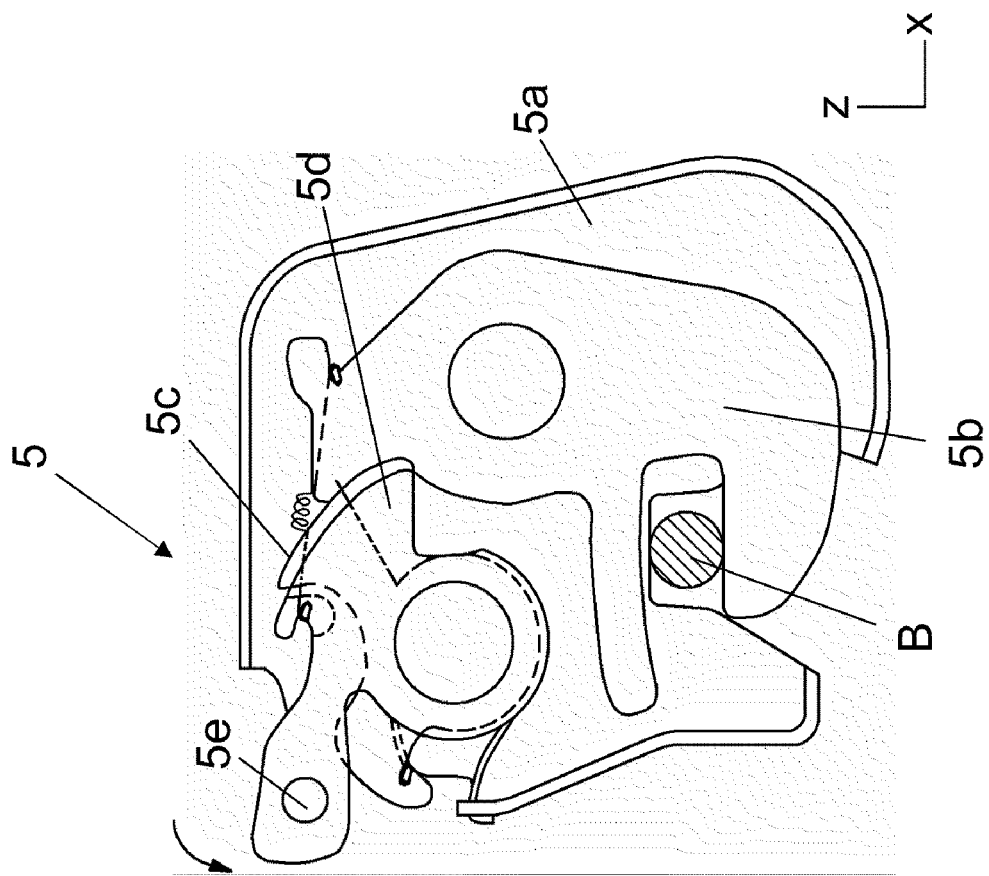
FIG. 9 is a section through a lock.
Figure 8:
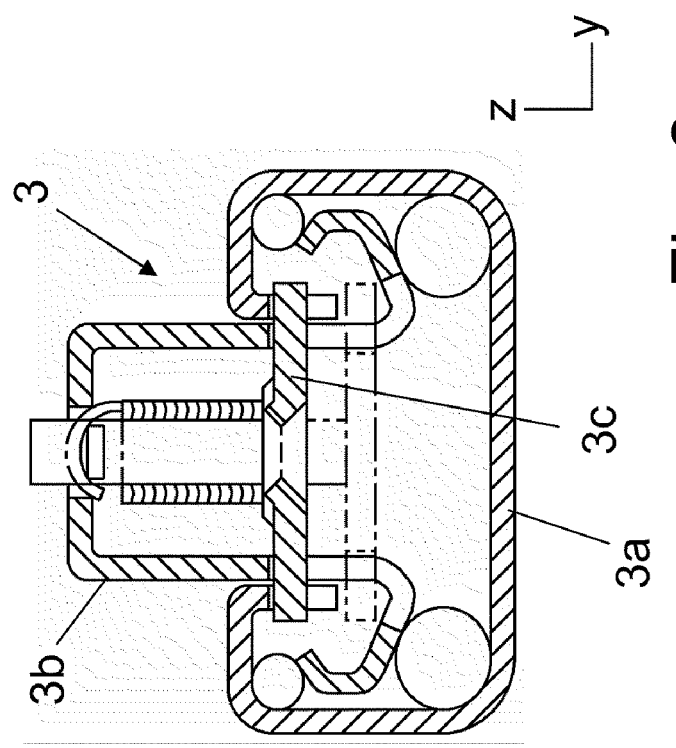
FIG. 8 is a section through a pair of seat rails, whereby the position of the rail lock in the unlocked state is shown in broken line.

Referring to the drawings in particular, a lengthwise adjustable vehicle seat 1, presently for a motor vehicle, has a pair of seat rails 3 each on both sides of the vehicle seat, which are used for adjusting a variety of longitudinal positions of the seat (positions in the seat longitudinal direction x). The seat longitudinal direction x defines the direction data used below along with the horizontal seat transverse direction y at right angles thereto and the vertical z at right angles thereto. Each pair of seat rails 3 consists of a first seat rail 3a, a second seat rail 3b and a rail lock 3c. In the present exemplary embodiment, the first seat rails 3a are connected to the vehicle structure in a manner described in detail later, while the second seat rails 3b form a fixed component of the seat structure (including seat base portion and backrest), as a result of which they are connected rigidly to one another in the seat transverse direction y and carry the vehicle seat 1.

The two seat rails 3a and 3b extend over one another alternately with the intermediate positioning of balls and are displaceably guided in relation to each other in the seat and rail longitudinal direction x. In the present exemplary embodiment, the rail lock 3c is a locking plate having a pin and teeth, which is arranged within the installation space surrounded by the two seat rails 3a and 3b, is guided by means of the pin in the second seat rail 3b, is pretensioned by a spring, and with its teeth, cooperates with the first seat rail 3a in various longitudinal positions of the seat, stated more accurately meshes with matching teeth of the first seat rail 3a, in order to lock the pair of seat rails 3. If the pin of the rail lock 3c projecting over the second seat rail 3b is acted on, e.g., for example, pressed into the installation space surrounded by the two seat rails 3a and 3b, the teeth of the rail lock 3c becomes unmeshed from the first seat rail 3a, so that the pair of seat rails 3 is unlocked.

The vehicle seat 1 has a lock U or position latch 5 at the rear end of each pair of seat rails 3. The lock 5 is fastened to the first seat rail 3a with its housing 5a and can be locked with a counterelement B to the vehicle structure, and preferably to the vehicle floor with a bolt, to lock the seat 1 in the use position as shown in FIGS. 2 and 9.

To this end, the lock or position latch 5 has a pawl 5b, which is pivotably mounted at the housing 5a and which picks up the counterelement B with a jaw and presses it against the housing 5a. Generally, the pawl 5b is secured by a tensioning cam 5c, which, spring-preloaded with an eccentrically curved surface, acts on the pawl 5b with a locking torque and sets it free from backlash. In case of a crash, the pawl 5b may experience an opening torque and may be slightly pivoted open against the pretensioning of the tensioning cam 5c. The pawl 5b is then secured by a catching element 5d, which supports the pawl 5b with a—for example, flat or concentrically curved—surface, such that the pivoting-open pawl 5b cannot exert any opening torque onto the catching element 5d. For unlocking, at first the catching element 5d is to be pivoted, for which an unlocking bolt 5e projects from the catching element 5d, which is to be pressed downwards in the present case. The pivoting catching element 5d then takes the tensioning cam 5c with it in a path-delayed manner, in order to release the pawl 5b, as a result of which this releases the counterelement B. The lock or position latch 5 is then unlocked and the first rail 3a can move into the non-use position as shown in FIG. 3. Catching element 5d and/or tensioning cam 5c are preferably designed such that they are able to keep the pivoted pawl 5b open until a counterelement B reaches the jaw of the pawl 5b.

At the front end of each pair of seat rails 3, the vehicle seat 1 has a hinge 7, by means of which the first seal rail 3a is respectively connected to the vehicle structure. Apart from the use position that is suitable for the transport of passengers, in which it may assume various longitudinal positions of the seat, the vehicle seat 1 can assume a folded nonuse position (a package position in the present case). If the backrest of the vehicle seat is pivoted beforehand and the lock 5 is unlocked on both sides of the vehicle seat, the vehicle seat 1 may pivot about a pivot axis, which is defined by the two hinges 7 in alignment with one another—by about 90°—upwards into the upright (i.e., directed into the vertical z) nonuse position.

A rail actuation device 12 is provided for acting on the rail lock 3c. The rail actuation device 12 has, in a manner known per se, a first cross tube 12a running in the seat transverse direction y, which [cross tube] is rotatably mounted on the second seat rail 3b on both sides of the vehicle seat. A first input element 12b pointing forwards, as well as two first output elements 12c pointing backwards are nonrotatably arranged on the first cross tube 12a. The first input element 12b may have a U-shaped design (and be fastened to the first cross tube 12a at both ends) or L-shaped design (and be fastened to the first cross tube 12 at one end). The first output elements 12c may be offset arms, for example, when the bearing for the first cross tube 12a sits on the second seat rail 3b. If the occupant of the vehicle seat 1 pivots the first input element 12b upwards, the first cross tube 12a is rotated, and the first output elements 12c pivot downwards onto the second seat rail 3b, where they act on the pin of the rail lock 3c and consequently unlock the associated pair of seat rails 3.

A lock actuation device or unlocking selector 14 is provided for acting on the lock 5. The lock actuation device 14 has a second cross tube 14a running in the seat transverse direction y, which is rotatably mounted on the second seat rail 3b on both sides of the vehicle seat and is preferably pretensioned by means of a spring, and has a second input element 14b. Two second output elements 14c pointing backwards are nonrotatably arranged on the second cross tube 14a. The second input element 14b may be a clamp, which is nonrotatably fastened to the second cross tube 14a, and has, e.g., a U-shaped design (and fastened to the second cross tube 14a at both ends) or an L-shaped design (and fastened to the second cross tube 14a at one end). FIG. 1 shows such an input element 14b. The second input element 14b may also be a pivotable lever, which is connected to the seat structure, i.e., is mounted pivotably in relation to the second seat rails 3b, and which is connected in an articulated manner to one of the two output elements 14c by means of an intermediate lever 14d connected on both sides. The second input element 14b preferably includes a supporting loop 14e, as is shown in FIGS. 10 through 13. The second input element 14b may also be a component of one of the second output elements 14c.

The second output elements 14c associated with each of the locks 5 are provided, in a fork-shaped manner, with a mount opened backwards in the seat longitudinal direction x, by means of which [mount] they are able to pick up the unlocking bolt 5e of the associated lock 5 (FIGS. 4, 5 and 10). If the occupant of the vehicle seat 1 pivots the second input element 14b by pulling the supporting loop 14e, then this movement is given to the second output elements 14c by means of the second cross tube 14a and/or of the intermediate lever 14d, which pivot downwards. Insofar as they have picked up the unlocking bolt 5e of the locks 5, they press the unlocking bolt 5e downwards with the lateral flanks of the mounts (FIGS. 6 and 11) and consequently unlock the locks 5. Since the locks 5 are each designed such that the pivoted pawl 5b is held open, the unlocking bolt 5e provided on the catching element 5d remains in the lower position. If the vertical dimension of the mount is only slightly greater than the diameter of the unlocking bolt 5e, then the two output elements 14c remain pivoted downwards (FIG. 6). If the vertical dimension of the mount is markedly greater than the diameter of the unlocking bolt 5e, e.g., corresponds to its entire path of pivoting, then the second output elements 14c may pivot back into their starting position—because of the pretensioning of the second cross tube 14a (FIG. 12).

As mentioned above, the vehicle seat 1 can be converted from the use position (FIG. 2) into the nonuse position (FIG. 3). So that during pivoting the vehicle seat 1 does not impact the vehicle floor before reaching the nonuse position, the vehicle seat 1 must, if possible, be located in the rearmost longitudinal position of the seat. For this purpose, a stop 16 or interlock is provided, which stops or makes inoperative an actuation of the lock actuation device 14 with the rail actuation device 12 actuated, and stops or makes inoperative an actuation of the rail actuation device 12 with the lock actuation device 14 actuated, i.e., prevents a dual actuation. However, the single actuations are uncoupled in their starting position.

When the vehicle seat 1 is located in a front longitudinal position of the seat, the unlocking bolt 5e is arranged outside of the mount of the second output element 14c, which travels with the second seat rail (FIGS. 7 and 13). If the rail actuation device 12 is actuated, this has no effect on the lock actuation device 14 or on the locks 5. If an attempt is now made to actuate the lock actuation device 14, the second output element 14c pivots into a void, as a result of which the unlocking bolt 5e cannot pivot, i.e., the lock actuation device 14 is inoperative.

A plurality of embodiments are possible for the stop 16.

In a first exemplary embodiment, the stop 16 is a rigid bar. The stop 16 is connected, on the one hand, namely at its front end, to a third output element 18 sitting nonrotatably on the first cross tube 12a, and suspended in a longitudinal hole formed concentrically to the first cross tube 12a, as a result of which a slot-pin guide with a void 18a is defined between the stop 16 and the third output element 18. On the other hand, namely at its rear end, the stop 16 is connected to one of the second output elements 14c, suspended in an articulated manner in the present case. The stop 16 may also be connected to another component that is nonrotatable with the second cross tube 14a.

During the unlocking of the pair of seat rails 3 in the rearmost longitudinal position of the seat, when the first cross tube 12a is rotated, the third output element 18 also pivots. Insofar as the locks are locked, the stop 16 is first located at the front end of the void 18a. During the pivoting of the third output element 18, it will only pass through the void 18a, so that the stop 16 remains unmoved (and thus inoperative), i.e., the lock actuation device 14 is uncoupled from the rail actuation device 12. When the vehicle seat 1 is located in a rear longitudinal position of the seat, the stop 16 becomes operative after passing through the void 18a. The unlocking bolts 5e are arranged within the mounts of the second output elements 14c. If an attempt were made during the unlocking of the pair of seat rails 3 to actuate the lock actuation device 14, then the third output element 18 would hold back the stop 16, which would in turn hold back the associated second output element 14c, so that neither do these pivot nor may the second cross tube 14a rotate.

During the unlocking of the locks 5, when the second cross tube 14a rotates, that second output element 14c, to which the stop 16 is connected, pivots as well. The stop 16 is consequently pulled backwards. However, its front end passes through only the void 18a, so that the third output element 18 remains unmoved, i.e., the rail actuation device 12 is uncoupled from the lock actuation device 14. However, the stop 16 becomes operative after passing through the void 18a. With the lock 5 opened, when the catching element 5d and/or tensioning cam 5c hold open the pivoted-open pawl 5b, the unlocking bolt 5e is located in its lower position. It then also holds the second output element 14c pivoted and the stop 16 pulled backwards, i.e., the void is passed through. If an attempt were now made to actuate the rail actuation device 12, the stop 16 would hold back the third output element 18, as a result of which the first cross tube 12a could not rotate, i.e., the rail actuation device 12 would be stopped.

In a second exemplary embodiment the stop 16 is a lip on one or both of the second output elements 14c, projecting transversely to the seat longitudinal direction x, namely in the vertical z which partly limits the fork-shaped mount for the unlocking bolt 5e. When the lock 5 is locked (FIG. 10), the unlocking bolt 5e is located above the stop 16. The rail actuation device 12 is hence uncoupled, so that other longitudinal positions of the seat may be assumed after the unlocking of the pair of seat rails (FIG. 13).

During the unlocking of the locks 5 (FIG. 11), the unlocking bolt 5e is pivoted downwards by the output element 14c, where it remains—because the catching element 5d and/or the tensioning cam 5e hold open the pivoted-open pawl 5b, when the output element 14c pivots back again because of the pretensioning of the second cross tubes 14a (FIG. 12). The unlocking bolt 5e is then located in the seat longitudinal direction x in front of the stop 16, which is now operative. If an attempt were now made to actuate the rail actuation device 12, then the pair of seat rails 3 may be unlocked, but cannot be displaced in relation to one another. The stop 16 mounted on the second seat rails 3b is hooked onto the unlocking bolt 5e mounted on the first seat rail 3a. The rail actuation device 12 is thus inoperative.

While a specific embodiment of the invention has been shown and described in detail to illustrate the application of the principles of the invention, it will be understood that the invention may be embodied otherwise without departing from such principles.

APPENDIX

| List of Reference Numbers | |
|---|---|
| 1 | Vehicle seat |
| 3 | Pair of seat rails |
| 3a | First seat rail |
| 3b | Second seat rail |
| 3c | Rail lock |
| 5 | Lock |
| 5a | Housing |
| 5b | Pawl |
| 5c | Tensioning cam |
| 5d | Catching element |
| 5e | Unlocking bolt |
| 7 | Hinge |
| 12 | Rail actuation device |
| 12a | First cross tube |
| 12b | First input element |
| 12c | First output element |
| 14 | Lock actuation device |
| 14a | Second cross tube |
| 14b | Second input element |
| 14c | Second output element |
| 14d | Intermediate lever |
| 14e | Supporting loop |
| 16 | Stop |
| 18 | Third output element |
| 18a | Void |
| B | Counterelement |
| x | Seat longitudinal direction |
| y | Seat transverse direction |
| z | Vertical |

What is claimed is:

1. A vehicle seat comprising:
   a lockable pair of seat rails for adjusting various longitudinal positions of the seat, which the vehicle seat can assume in a use position suitable for the transport of passengers, said pair of seat rails including a first seat rail connected to vehicle structure by means of the lock, a second seat rail displaceable between first and second end positions in relation to the first seat rail in the longitudinal direction of the seat, the second seat rail carrying the vehicle seat, and a rail lock on which the rail actuation device acts;
   a rail actuation device for activating said rail lock and unlocking the pair of seat rails;
   a lock for locking with the vehicle structure, whereby the vehicle seat, after unlocking the lock, can be converted from the use position into a nonuse position;
   a lock actuation device for unlocking the lock; and
   a stop operative between the pair of seat rails and/or the rail actuation device, on the one hand, and the lock actuation device and/or lock, on the other hand, said stop operative only connecting said lock actuation device with said lock in said first end position.

2. A vehicle seat in accordance with claim 1, wherein the lock is provided at said first end of the first seat rail, and the first seat rail at said second end is connected to the vehicle structure by means of a hinge.

3. A vehicle seat in accordance with claim 2, wherein the vehicle seat pivots about the hinge when converting from the use position into an upright nonuse position.

4. A vehicle seat in accordance with claim 1, wherein the rail actuation device and/or lock actuation device has a cross tube mounted rotatably on the second seat rail, each of the rail actuation device and lock actuation device include cross tube input elements and output elements provided in nonrotatable manner at the second seat rail.

5. A vehicle seat in accordance with claim 4, wherein the stop is connected, on the one hand, to an output element of the rail actuation device and, on the other hand, to an output element of the lock actuation device.

6. A vehicle seat in accordance with claim 5, wherein a void is provided between at least one end of the stop and an associated output element.

7. A vehicle seat in accordance with claim 4, wherein the stop is provided at an output element of the lock actuation device.

8. A vehicle seat in accordance with claim 4, wherein the output element of the lock actuation device has a fork-shaped design with a mount for an unlocking bolt of the lock.

9. A vehicle seat in accordance with claim 6, wherein the stop partly limits the mount for the unlocking bolt.

10. A vehicle seat in accordance with claim 1, wherein the rail actuation device is to be actuated and/or is operative only with a locked lock and thus is uncoupled from the lock actuation device.

11. A vehicle seat in accordance with claim 1, wherein the lock actuation device is to be actuated and/or is operative only with the pair of seat rails locked in a rear position in a vehicle longitudinal direction of the seat and thus is uncoupled from the rail actuation device.

12. A vehicle seat in accordance with claim 1, wherein:
a seat base with connected backrest is mounted on said second rail;
said first seat rail is pivotally connected to the vehicle structure;
said first and second rails are movable relative to each other for adjusting various longitudinal positions of the seat base with connected backrest in use positions for the transport of passengers;
said rail lock locks said first and second rails together;
said lock locks the seat base with connected backrest with the vehicle structure in the use position, whereby the vehicle seat, after unlocking the lock, can be converted from the use position into a non-use position.

13. A vehicle seat in accordance with claim 1, wherein:
said first seat rail is arranged closer to the vehicle structure than said second seat rail is arranged to the vehicle structure;
said second seat rail is arranged closer to the vehicle seat then to said first seat rail is arranged to the vehicle seat, said second seat rail being movable with the vehicle seat relative to the vehicle structure;
said stop operative being arranged on said second seat rail and movable with said second seat rail relative to said first seat rail.

14. A vehicle seat in accordance with claim 13, wherein:
one of said rail actuation device and said lock actuation device is mounted on said second seat rail and movable with said second seat rail relative to said first seat rail.

* * * * *